US008567800B2

(12) United States Patent
Lukasiak

(10) Patent No.: US 8,567,800 B2
(45) Date of Patent: Oct. 29, 2013

(54) PAIR OF RUNNERS FOR WALKING AND/OR TRAVEL MOVEMENT

(75) Inventor: Zbigniew Lukasiak, Aleksandrow Lodzki (PL)

(73) Assignee: Alreh Medical SP. Z.O.O., Warszawa (PL)

( * ) Notice: Subject to any disclaimer, the term of this patent is extended or adjusted under 35 U.S.C. 154(b) by 86 days.

(21) Appl. No.: 13/206,744

(22) Filed: Aug. 10, 2011

(65) Prior Publication Data

US 2012/0074661 A1 Mar. 29, 2012

(30) Foreign Application Priority Data

Sep. 29, 2010 (PL) ........................................ 392529

(51) Int. Cl.
*B62M 1/00* (2010.01)

(52) U.S. Cl.
USPC .................................. 280/87.021; 280/87.03

(58) Field of Classification Search
USPC .......... 280/87.021, 87.041, 87.05, 7.12, 7.11, 280/87.051, 816, 809
See application file for complete search history.

(56) References Cited

U.S. PATENT DOCUMENTS

| | | | | |
|---|---|---|---|---|
| 3,738,674 | A * | 6/1973 | Pauls | 280/816 |
| 4,165,127 | A * | 8/1979 | Vago | 297/344.18 |
| 4,363,495 | A * | 12/1982 | Henson | 280/818 |
| 5,538,268 | A * | 7/1996 | Miller | 280/87.05 |
| 6,305,395 | B1 | 10/2001 | Oledzki et al. | |
| 6,592,150 | B2 * | 7/2003 | Kernan | 280/809 |
| 6,607,202 | B1 * | 8/2003 | Palmer | 280/87.021 |
| 6,733,018 | B2 * | 5/2004 | Razon | 280/87.021 |
| 7,150,722 | B1 * | 12/2006 | Tyrrell | 602/23 |
| 7,735,499 | B1 * | 6/2010 | Pennise | 280/87.051 |

FOREIGN PATENT DOCUMENTS

| | | |
|---|---|---|
| PL | 319821 | 11/1998 |
| PL | 195173 | 5/2000 |
| PL | 197944 | 4/2001 |
| PL | 204062 | 10/2002 |
| PL | 367924 | 5/2004 |
| WO | 98/49991 | 11/1998 |
| WO | 2004034948 | 4/2004 |

* cited by examiner

*Primary Examiner* — Hau Phan
(74) *Attorney, Agent, or Firm* — Katten Muchin Rosenman LLP

(57) ABSTRACT

Pair of runners for walking and/or travel movement characterized by the fact that the secondary beam (1*b*) contains at least two sets of wheels (5), one in the rear of a runner and the second the front of a runner, while the main beam (1*a*) includes at least two feet (6*a*) made of flexible material or at least two rolling sets (6*b*); at least one set of wheels (5) in every runner is equipped with mechanism for locking of the wheels rotation and runners are connected by a stabilization rod (8).

3 Claims, 7 Drawing Sheets

PAIR OF RUNNERS FOR WALKING AND/OR TRAVEL MOVEMENT

BACKGROUND OF THE INVENTION

1. Technical Field

The subject of the invention is a pair of runners for walking and/or travel movements applicable in devices for active rehabilitation of disabled persons with paresis or paralysis of lower limbs, to enable these persons to stand up from a wheelchair to an upright position, and move in any direction by performing alternating short steps or alternating brief travel movements.

2. Background Art

There are known inventions relating to devices enabling disabled persons to walk in an upright position with different mechanisms applied for this purpose.

Patent description No. 195173 presents a device having runners in the shape of trapezoids with retractable supports with brackets at the ends.

From the description of the reported invention "Device enabling disabled persons to walk," No. P 319 821 are known runners rigidly fixed and based on the ground.

From the description of the reported invention No. P 367924 are known runners arranged parallel to each other, connected to each other with a transverse rod of variable length.

From the description of the reported invention "Motion system, maintaining a balance and providing rest, of the device enabling people with paresis of the lower limbs to walk" No. P 340 440, are known runners in the shape of trapezoids, whose arms have retractable supports with brackets. To longer sides of the trapezoids there are mounted cylinders, and to the shorter sides—platforms.

From the description of the reported invention "Device enabling persons with paresis of lower limbs to walk," No. P 347347 are known trapezoidal runners with fixed to them outriggers with retractable arms.

From the description of a patent No. 204,062, "Device enabling people with paralysis or paresis of lower limbs to walk" is known a device with runners containing platforms and outriggers.

In known devices, there are runners for walking that are swivel connected to vertical brackets, to which are attached: knee supports, corset securing the pelvis of a disabled person and hand grips for maneuvering the device. Each runner is equipped with four feet made of flexible material, two feet are located near the axis of the platform on which feet of a disabled person rest, one in front and one in the rear, and the other two feet are placed in the outer part of the runner and provide protection against device overturning while walking Devices enable making alternating short steps of length 10-20 cm.

BRIEF SUMMARY OF THE INVENTION

The essence of the invention is a pair of runners to make steps and/or travel movements, in which the secondary beam contains at least two sets of wheels, one in the rear of a runner and the second the front of a runner, while the main beam includes at least two feet made of flexible material or at least two rolling sets; at least one set of wheels in every runner is equipped with mechanism for locking of the wheels rotation and runners are connected by a stabilization rod.

In the solution according to the invention runners are swivel connected to vertical brackets, to which are attached: knee supports, corset securing the pelvis of a disabled person and hand grips for maneuvering the device. In this solution, a single runner has a shape similar to a trapezoid in which one of the bases is the main beam to which vertical supports are swivel connected, to which in turn are mounted: knee supports, corset securing the pelvis of a disabled person and hand grips for maneuvering the device, and the second base is an auxiliary beam, to which a platform is mounted to place and secure the feet of a disabled person. The main and auxiliary beam are connected by links, and each runner has a set of rolling wheels attached to the secondary beam, one set in the rear and one in front. To the main beam are fixed feet made of flexible material or rolling sets. At the rear of the auxiliary beam or the main beam can be fixed a one-way brake that allows to rotate the wheels forwards and does not allow for rotation to backwards.

Backward movement of the runners is prevented by a one-way brake which allows to rotate the set of wheels forwards and blocks rotation of wheels backwards.

Runners may be linked to the stabilization rod, whose task is to maintain a relatively constant spacing of runners during walking or travel movements.

The device, according to the invention enabling quick movement is equipped with runners with additional sets of rolling sets located in the place of feet. This solution allows to make much longer travel moves on one runner and is a typical device for locomotion.

BRIEF DESCRIPTION OF THE DRAWINGS

The invention is shown in the enclosed drawings FIGS. 1-7, in which.

DETAILED DESCRIPTION OF THE INVENTION

Figure 1:
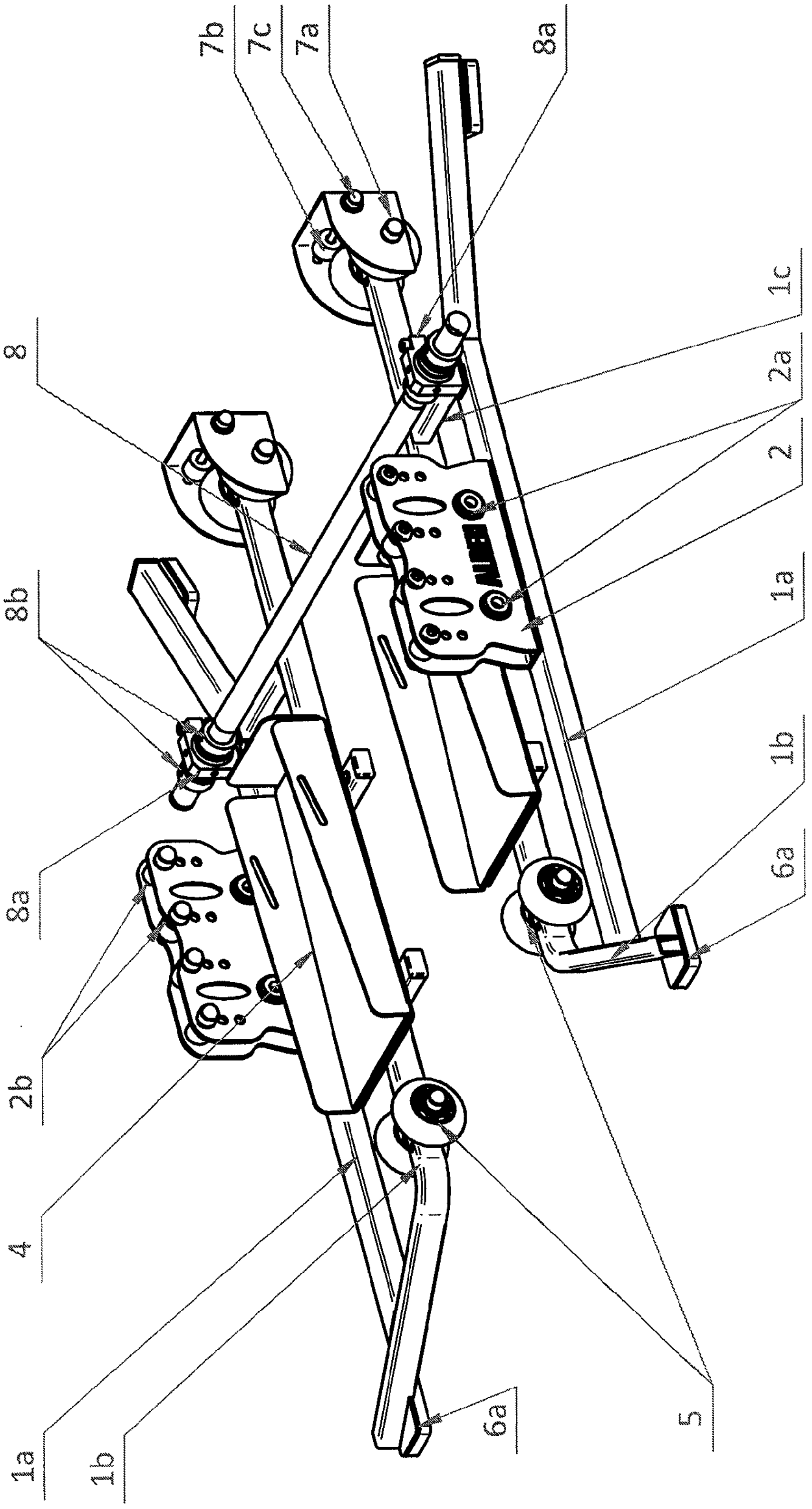
FIG. 1 shows a pair of runners equipped with mountings for the vertical brackets of the support structure working in a parallel bar system.
Figure 2:
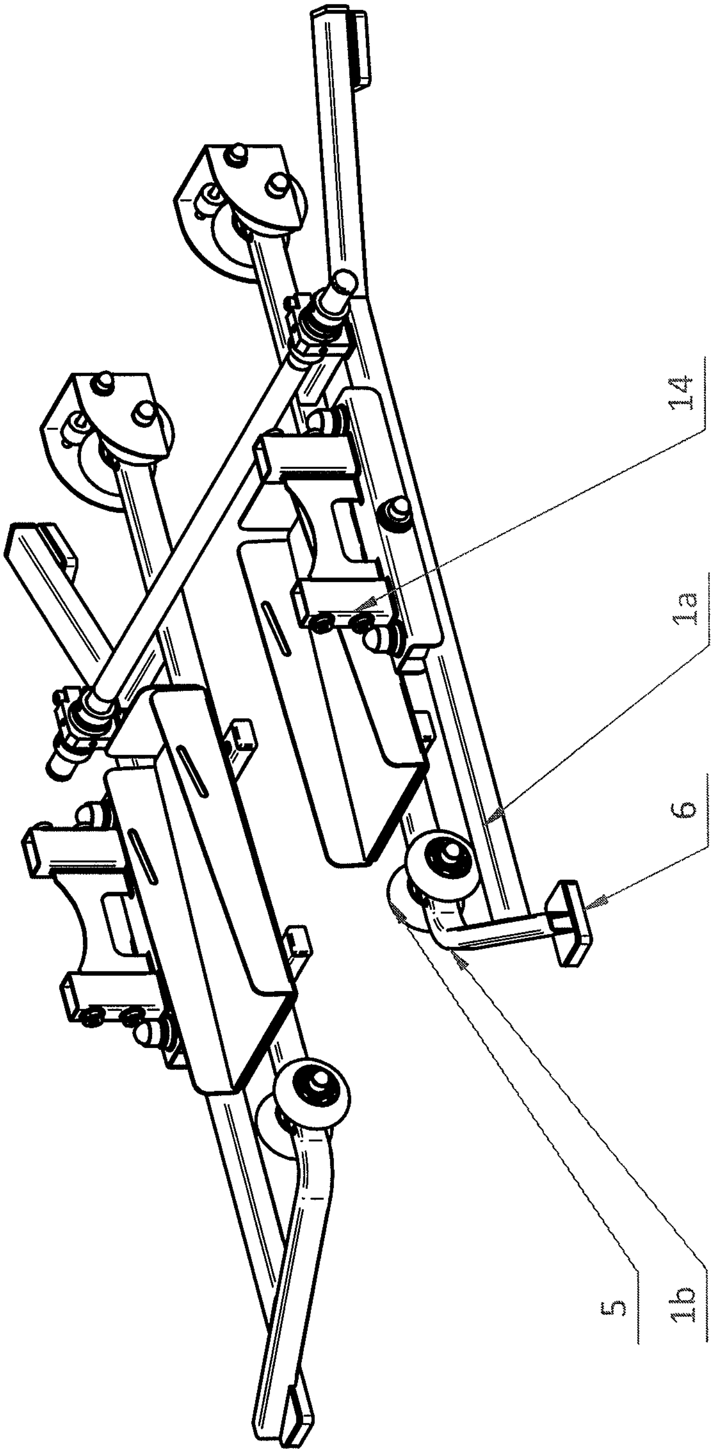
FIG. 2 shows a pair of runners, equipped with a lever for mounting of the vertical brackets of the supporting structure working in a swivel system.
Figure 3:
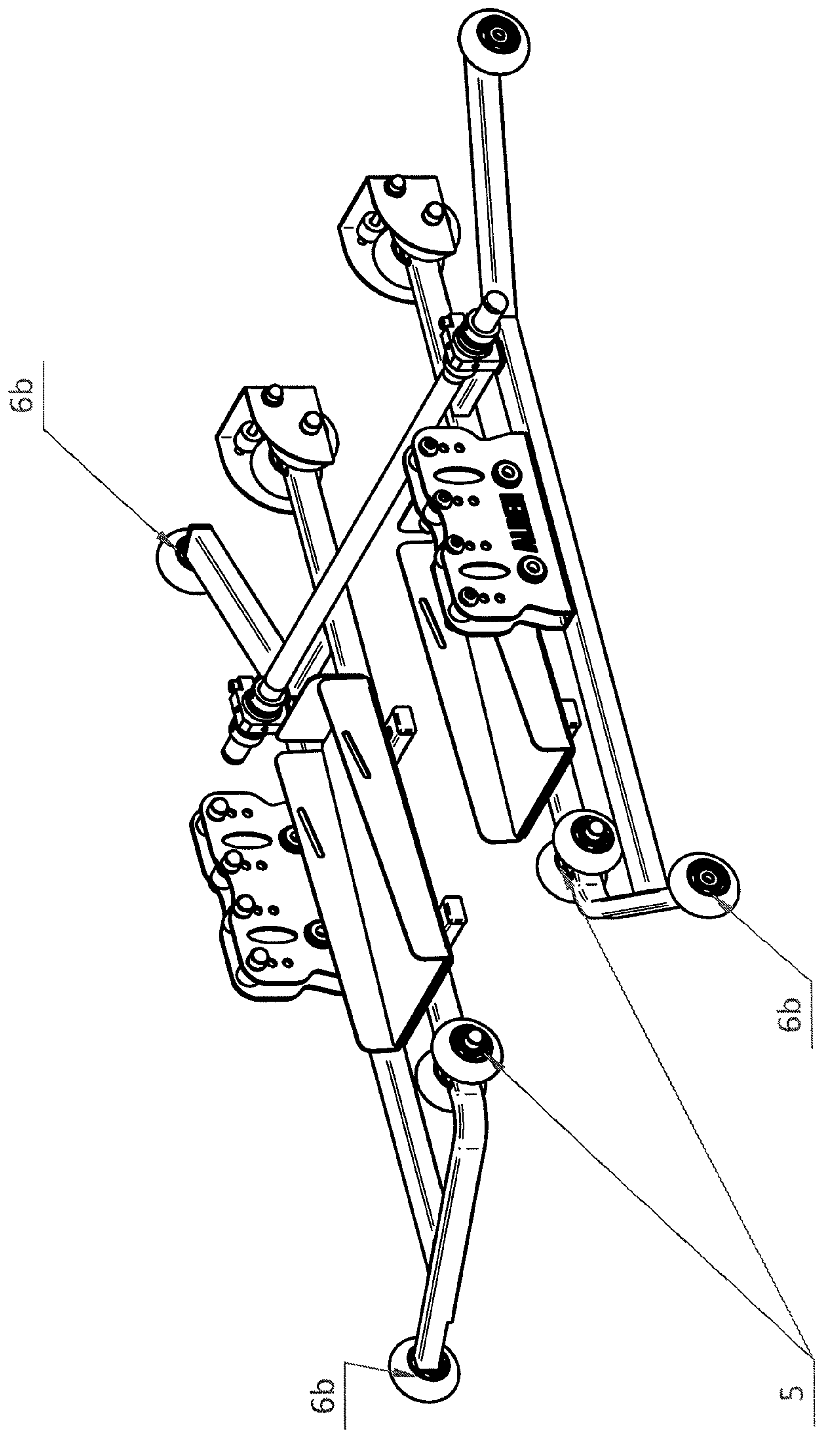
FIG. 3 shows a pair of runners fitted with mountings for the vertical brackets of the supporting structure working in a parallel bar system and rolling sets.
Figure 4:
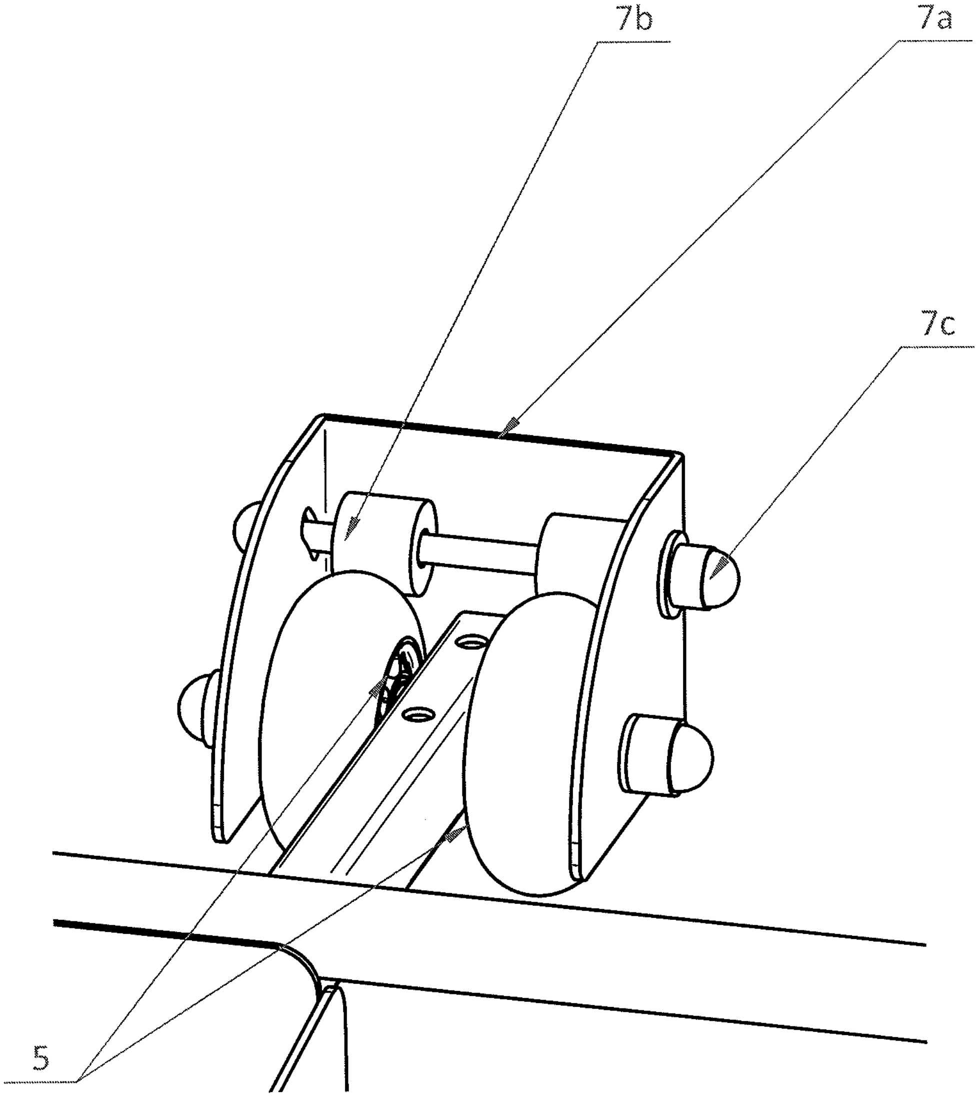
FIG. 4 shows the one-way brake.

A single runner (1) has a shape similar to a trapezoid in which one of the bases is the main bar (1*a*) having holders (2) for mounting of vertical supports (3). Holder (2) is equipped with two pins (2*a*) for swivel mounting of vertical brackets (3) and four shock absorbers (2*b*), one on each side of the vertical bracket (3), made of flexible material used to restrict the range of movement of the vertical bracket (3). The second trapezoid base is an auxiliary beam (1*b*), to which a platform is fastened (4) used to place and secure the feet of a disabled person. The main beam (1*a*) and the secondary beam (1*b*) are connected by links (1*c*), and each runner has a rolling set in the form of two pairs of wheels (5) fixed to the auxiliary beam, one set in the rear and one in front. To the main beam (1*a*) are fixed feet (6*a*) made of flexible material or rolling sets (6*b*). At the rear of the auxiliary beam (1*b*) or the main beam (1*a*) a one-way brake is mounted (7) made up of a cover (7*a*) and a running roller (7*b*) made of flexible material, mounted in the casing (7*a*) by means of a pin (7*c*). Runners are connected by a stabilization rod (8) mounted in holders by means of swivel and slide system (8*a*). The rod axial movement is limited by locks (8*b*).

A single runner (1) on the main beam (1*a*), has a swing lever (14) for attaching the vertical brackets of the supporting structure working in a swivel system, and two double sets of wheels (5) fixed to the auxiliary beam (1*b*), and to the main beam (1*a*) are fixed feet (6*a*) made of flexible material.

The movement by means of the device according to the invention is realized by making cyclic movements of the upper part of the trunk to the right and left. Trunk motion in one direction moves the center of gravity in the direction of performed movement thus relieving the opposite platform on which foot rests at the same time relieving the rolling elements of the opposite runner. Light pulling up the hand grip connected to the relieved runner results in runner movement forwards. Alternating movements of the torso to the right and left and simultaneous pulling up of the opposite hand grip results in cyclic moving forward of the right and left runner. Runners move by means of the rolling motion of the runner wheel sets. Fixing the axis of wheel sets perpendicular to longitudinal runner axes and eliminating the wheel rotation around own axis causes that slow moving forward is possible only with parallel arrangement of runners. Stopping the forward movement is caused by pulling the hand grips to the outside or to the inside and by setting the runners in a position other than parallel. Faster movement requires moving on one runner, with the opposite runner slightly raised above the ground. Too large tilt of a runner results in a contact of runner external feet with the ground and slowing the forward movement.

The new solution allows a disabled person to perform alternate steps as in the previous solutions or performing alternating rolling strokes of 50-100 cm, length, which makes that dynamic stander for stepping, which has so far been used only for physical exercises inside the buildings, can be used as a device for locomotion i.e. movement of a disabled person at longer distances, in an upright position without an external energy source, i.e. using only the muscles of arms and torso.

The subject of the invention is shown in the performance examples:

Example 1

Figure 5:
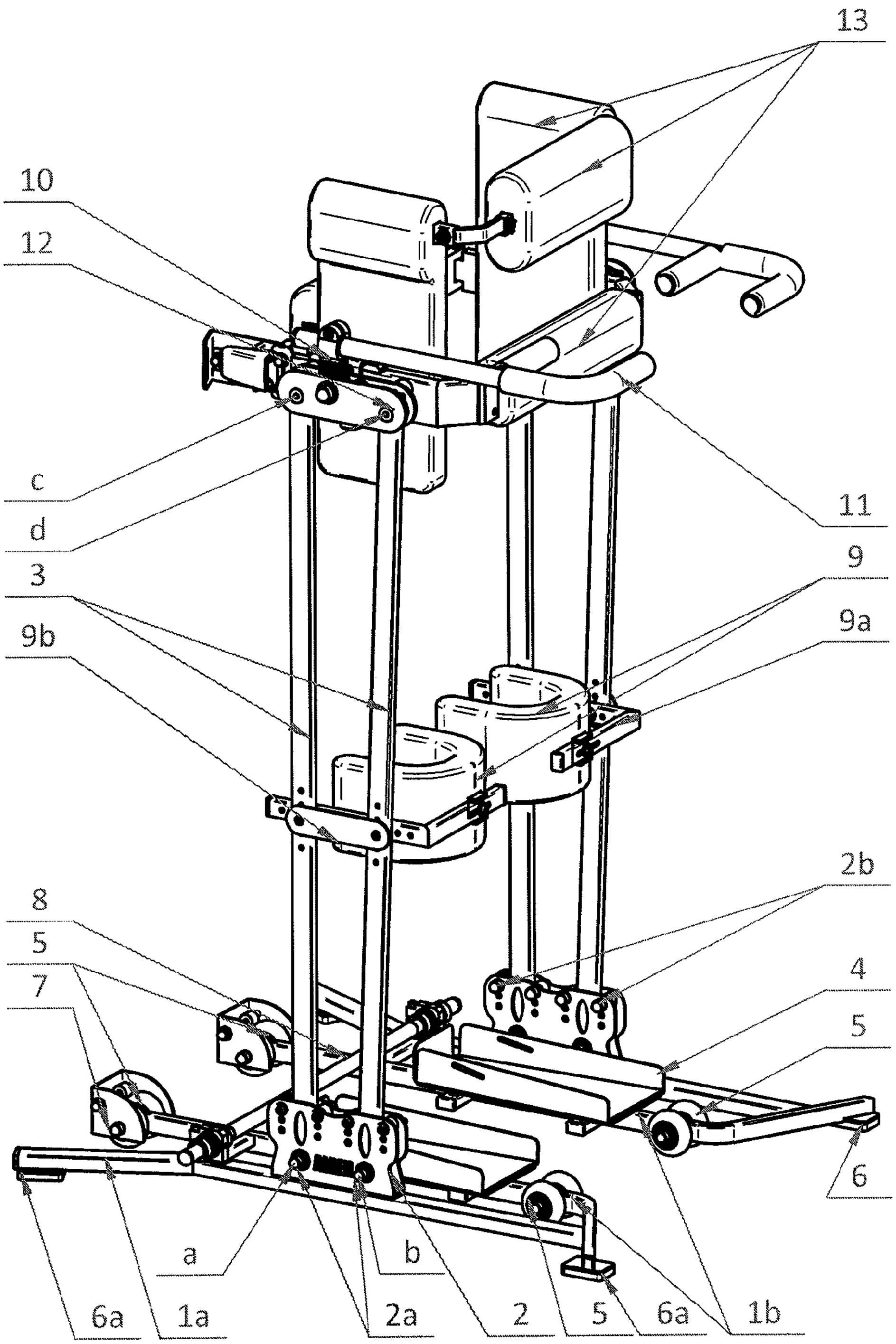
FIG. 5 shows the dynamic stander containing a pair of runners for walking, equipped with double sets of wheels and feet of flexible material, working in a parallel bar system.

Dynamic stander shown in FIG. 5 containing a pair of runners for walking equipped with double sets of wheels and feet made of flexible material. The vertical side brackets work in a parallel bar system. Two double sets of wheels are attached to the auxiliary beam, to the main beam are mounted feet made of flexible material. A single runner (1) has a shape similar to a trapezoid in which one of the bases is the main bar (1*a*) having holders (2) for mounting of vertical brackets (3). Holder (2) is equipped with two pins (2*a*) for swivel mounting of vertical brackets (3) and four shock absorbers (2*b*), one on each side of the vertical bracket (3), made of flexible material used to restrict the range of movement of the vertical bracket (3). The second trapezoid base is an auxiliary beam (1*b*), to which a platform is fastened (4) used to place and secure the feet of a disabled person. The main beam (1*a*) and the secondary beam (1*b*) are connected by links (1*c*), and each runner has a rolling set in the form of two pairs of wheels (5) fixed to the auxiliary beam, one set in the rear and one in front. To the main beam are fixed feet (6*a*) made of flexible material or rolling sets (6*b*). At the rear of the auxiliary beam or the main beam a one-way brake is mounted (7) made up of a cover (7*a*) and a running roller (7*b*) made of flexible material, mounted in the casing (7*a*) by means of a pin (7*c*). A one-way brake allows to rotate the wheels forward (5) and blocks the rotation of wheels backward. During rotation of the wheels consistent with the direction of travel, wheels (5) push a roller (7*b*) by moving it up and freely rotate in the direction of travel. Every movement of the wheel (5) in the opposite direction causes pressing the roller (7*b*) to the shield wall (7*a*) and locking the wheel rotation (5). Two runners, left and right are connected by a stabilization rod (8) mounted in holders by means of swivel and slide system (8*a*). The rod axial movement is limited by locks (8*b*). The role of the rod (8) is to maintain a relatively constant spacing of runners during walking or travel movements. To a pair of vertical brackets (3) a shank support is fixed (9) by means of a handle (9*a*) and plate (9*b*). To the upper part of the pair of vertical brackets (3) a corset holder is pivotally mounted (10) to which are hand grips are mounted (11) for maneuvering the device and an articulated system (12) in which a corset is fitted (13). Points (a, b, c, d) of swivel mounting of vertical brackets (3) to the holder (2) and handle (10) make a quadrangle, except that the best kinematic effects are achieved if it is an isosceles trapezium, brackets (3) are trapezoid sides, as in example or points make a parallelogram.

Example 2

Figure 6:
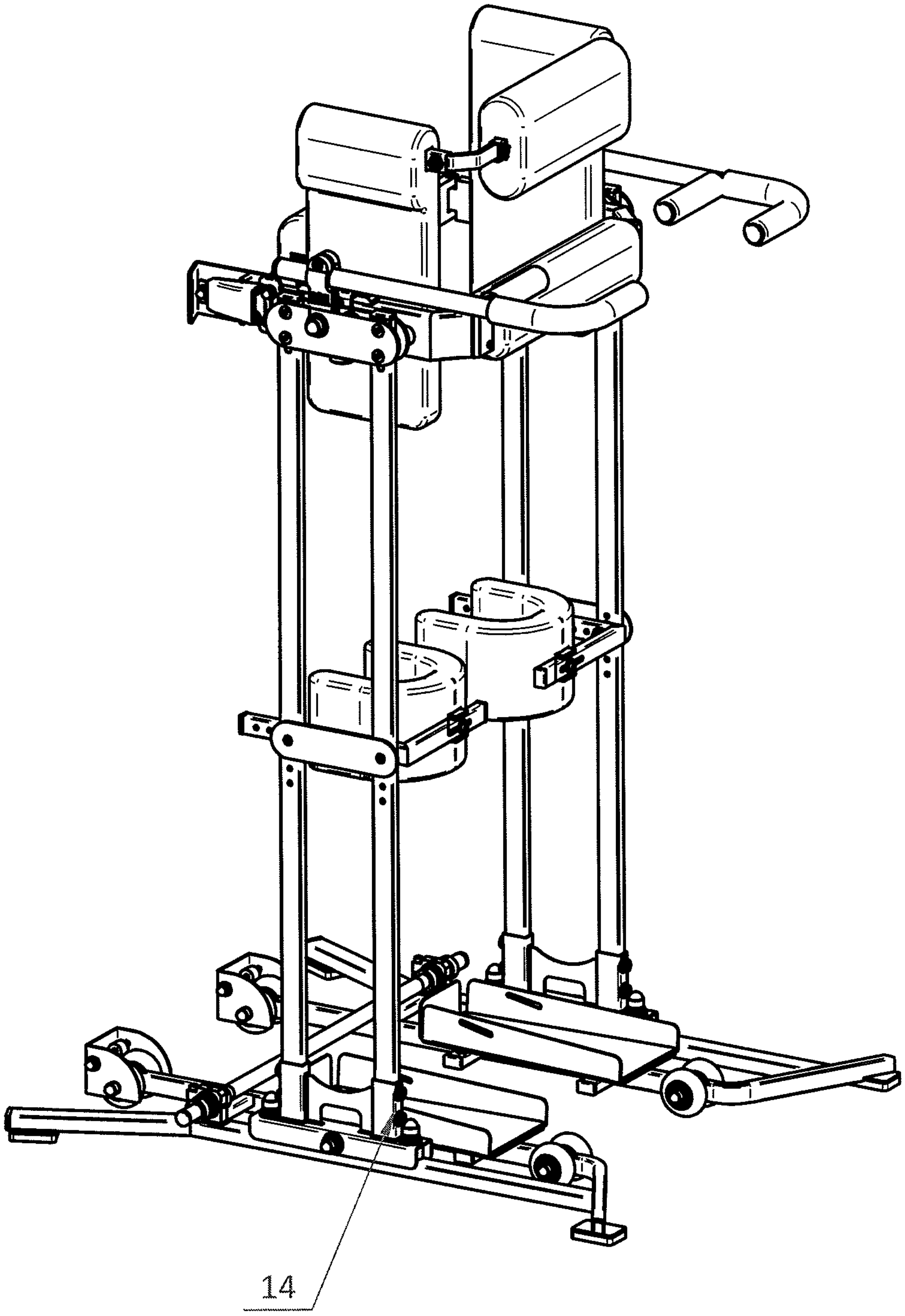
FIG. 6 shows the dynamic stander containing a pair of runners for walking, equipped with double sets of wheels and feet of flexible material, working in a swivel system.

Dynamic stander shown in FIG. 6, as described in Example 1, includes a pair of runners for walking equipped with a lever for attaching the vertical brackets of the supporting structure operating in a swivel system, and two double sets of wheels attached to the auxiliary beam and to the main beam feet of flexible material are attached.

Runners are connected by a stabilization rod.

Example 3

Figure 7:
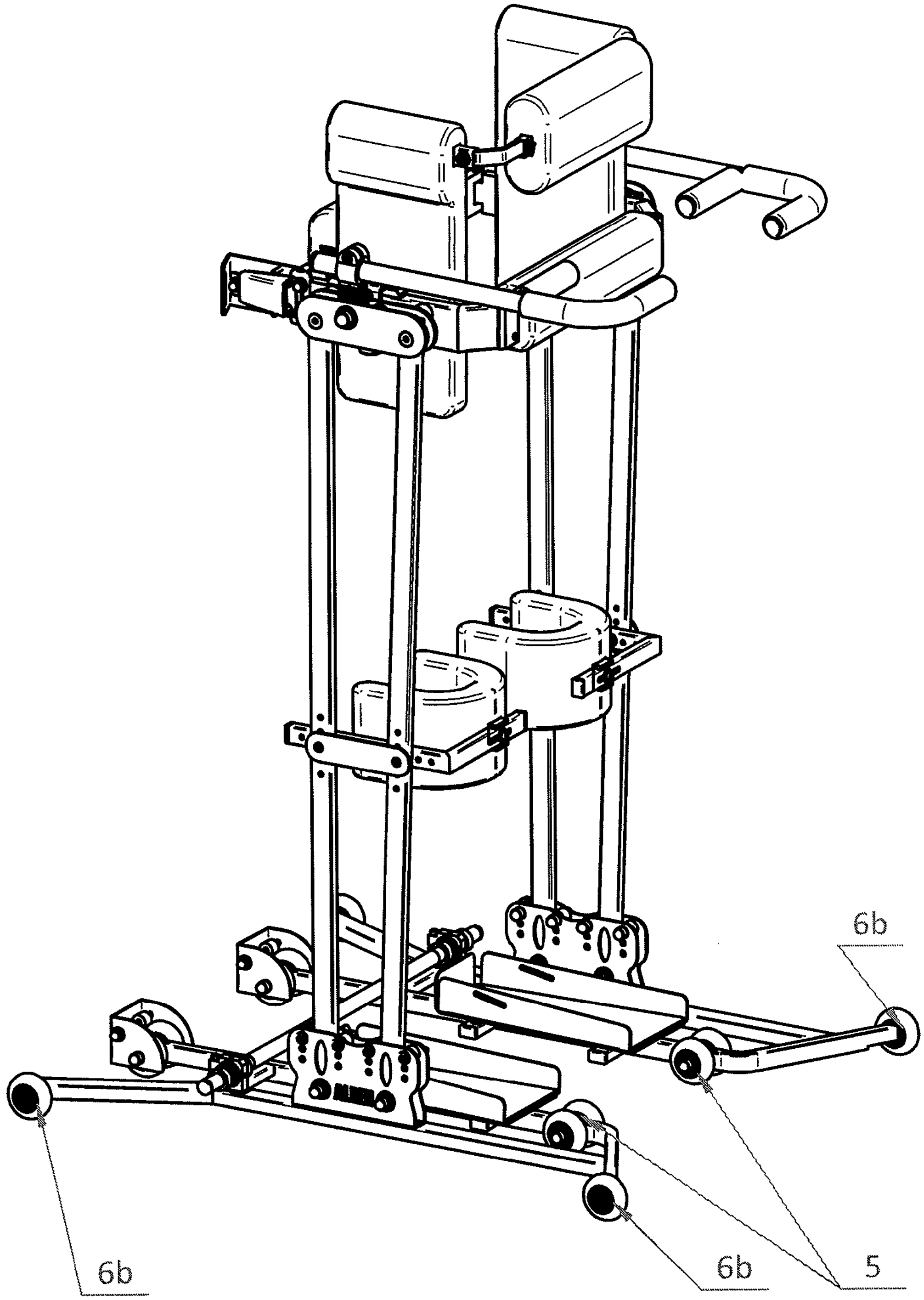
FIG. 7 shows the dynamic stander containing a pair of runners for walking, equipped with double sets of wheels and rolling sets, working in a parallel bar system.

Dynamic stander shown in FIG. 7, as described in Example 1, includes a pair of runners for walking, the vertical side brackets work in a parallel bar system. Stander has two double sets of wheels attached to the auxiliary beam, rolling sets are attached to the main beam. Runners are connected by a stabilization rod.

Performance examples do not limit the invention.

The invention claimed is:

1. A pair of runners, wherein each runner comprises:

a main beam with a holder for mounting vertical brackets, wherein the main beam includes at least two feet made of flexible material or at least two rolling sets; and an auxiliary beam to which a platform is fixed to secure the feet of a disabled person, wherein the auxiliary beam comprises at least two wheels, wherein a first wheel is located on a first side of the platform and a second wheel is located on a second side of the platform;

wherein the main beam and the auxiliary beam are connected by links, and wherein the first wheel, the second wheel, or both wheels is equipped with a mechanism for only allowing rotation in a single direction.

2. The pair of runners according to claim 1, wherein the pair of runners are connected by a stabilization rod.

3. The pair of runners according to claim 2, wherein the stabilization rod is pivotally mounted to the main beam of each runner.

* * * * *